US009323927B2

(12) United States Patent
Lee et al.

(10) Patent No.: US 9,323,927 B2
(45) Date of Patent: Apr. 26, 2016

(54) APPARATUS AND METHOD FOR GUARANTEEING SAFE EXECUTION OF SHELL COMMAND IN EMBEDDED SYSTEM

(71) Applicant: Electronics and Telecommunications Research Institute, Daejeon (KR)

(72) Inventors: Kwang-Yong Lee, Daejeon (KR); Beob-Kyun Kim, Daejeon (KR)

(73) Assignee: ELECTRONICS AND TELECOMMUNICATIONS RESEACH INSTIT, Daejeon (KR)

( * ) Notice: Subject to any disclaimer, the term of this patent is extended or adjusted under 35 U.S.C. 154(b) by 0 days.

(21) Appl. No.: 14/302,587

(22) Filed: Jun. 12, 2014

(65) Prior Publication Data

US 2015/0128250 A1    May 7, 2015

(30) Foreign Application Priority Data

Nov. 4, 2013   (KR) .................. 10-2013-0133144

(51) Int. Cl.
*G06F 21/51* (2013.01)
*G06F 21/55* (2013.01)

(52) U.S. Cl.
CPC .................... *G06F 21/554* (2013.01)

(58) Field of Classification Search
CPC ......... G06F 21/31; G06F 21/44; G06F 21/32; G06F 21/30; G06F 21/53; G06F 21/51; G06F 21/554
See application file for complete search history.

(56) References Cited

U.S. PATENT DOCUMENTS

| 4,918,653 | A | * | 4/1990 | Johri | G06F 9/468 340/5.74 |
| 5,032,979 | A | * | 7/1991 | Hecht | G06F 21/552 713/164 |
| 8,239,954 | B2 | * | 8/2012 | Wobber | G06F 21/6218 726/26 |
| 8,887,274 | B2 | * | 11/2014 | Buchanan | G06F 21/552 709/224 |
| 2003/0233571 | A1 | * | 12/2003 | Kraus | G06F 9/466 726/15 |
| 2006/0242703 | A1 | * | 10/2006 | Abeni | H04L 63/1408 726/23 |
| 2006/0265754 | A1 | * | 11/2006 | Birrell | G06F 21/6218 726/26 |
| 2006/0265759 | A1 | * | 11/2006 | Birrell | G06F 21/6218 726/27 |
| 2007/0130620 | A1 | * | 6/2007 | Pietraszek | G06F 21/51 726/22 |
| 2008/0046996 | A1 | * | 2/2008 | Smith | H04L 63/0272 726/15 |
| 2008/0083034 | A1 | * | 4/2008 | Kim | H04L 63/1433 726/25 |
| 2012/0096527 | A1 | * | 4/2012 | Pasternak | G06F 8/30 726/7 |
| 2013/0117554 | A1 | | 5/2013 | Ylonen | |
| 2013/0198835 | A1 | * | 8/2013 | Huang | G06F 21/31 726/19 |

FOREIGN PATENT DOCUMENTS

KR       1020100054940 A       5/2010

* cited by examiner

*Primary Examiner* — Yonas Bayou
(74) *Attorney, Agent, or Firm* — William Park & Associates Ltd.

(57) ABSTRACT

Provided are an apparatus and method for enhancing security and safety of an embedded system by monitoring and blocking unauthorized execution of a shell command in the embedded system.

The apparatus for guaranteeing safe execution of the shell command in the embedded system includes a shell command detection part configured to detect an execution request of the shell command, and a shell command execution control part configured to control execution of the shell command according to whether a password based on safety is provided for the detected shell command.

10 Claims, 6 Drawing Sheets

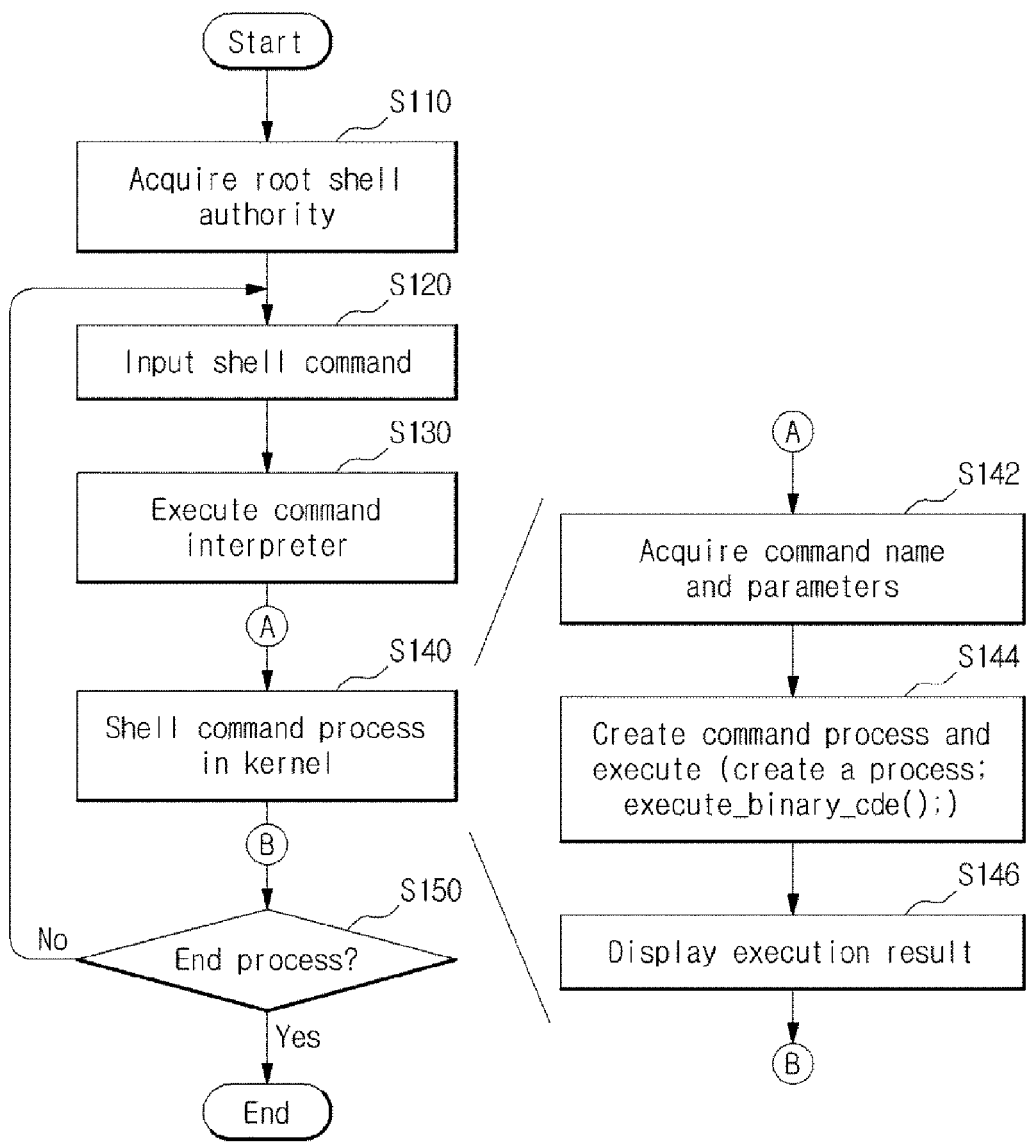

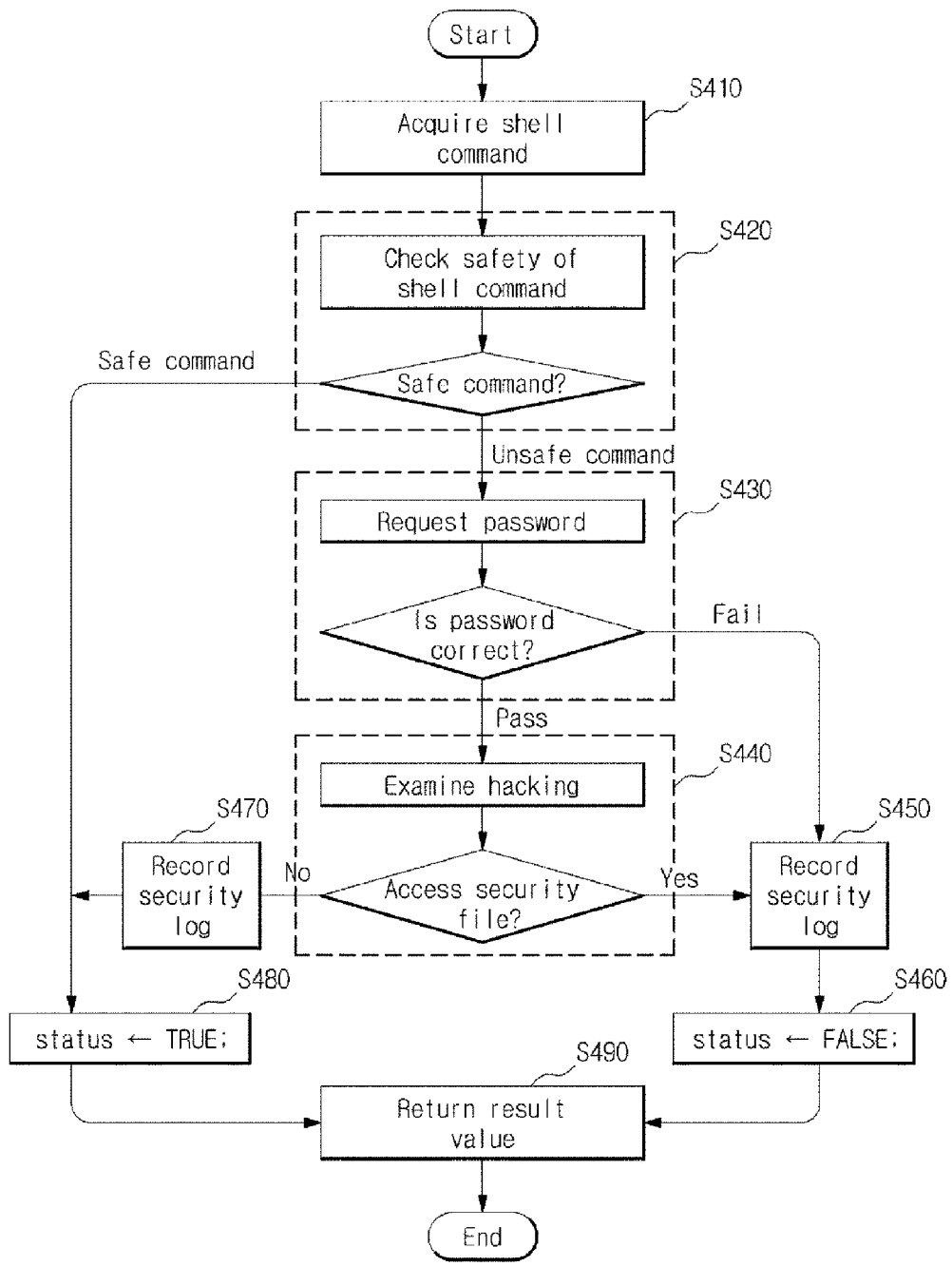

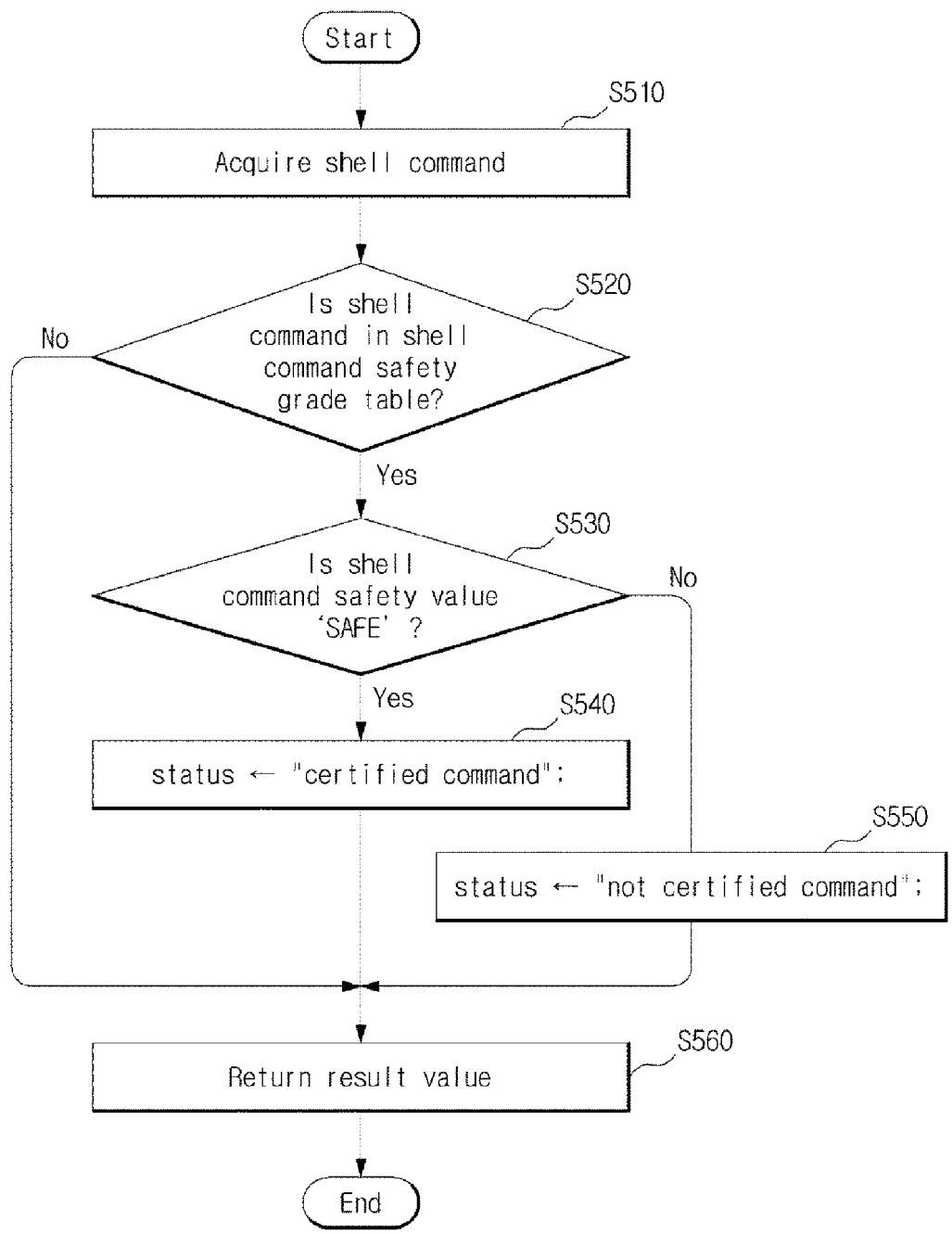

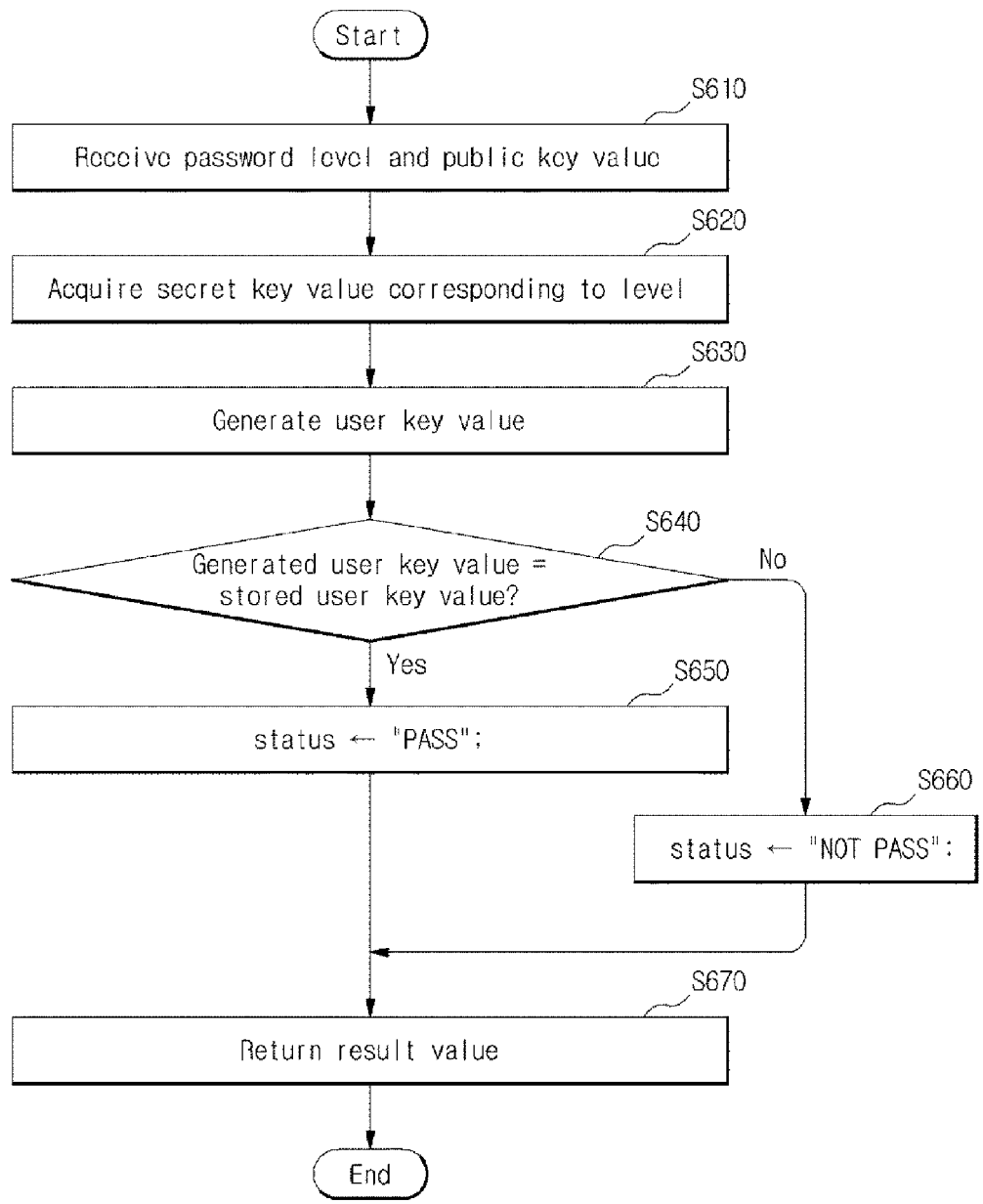

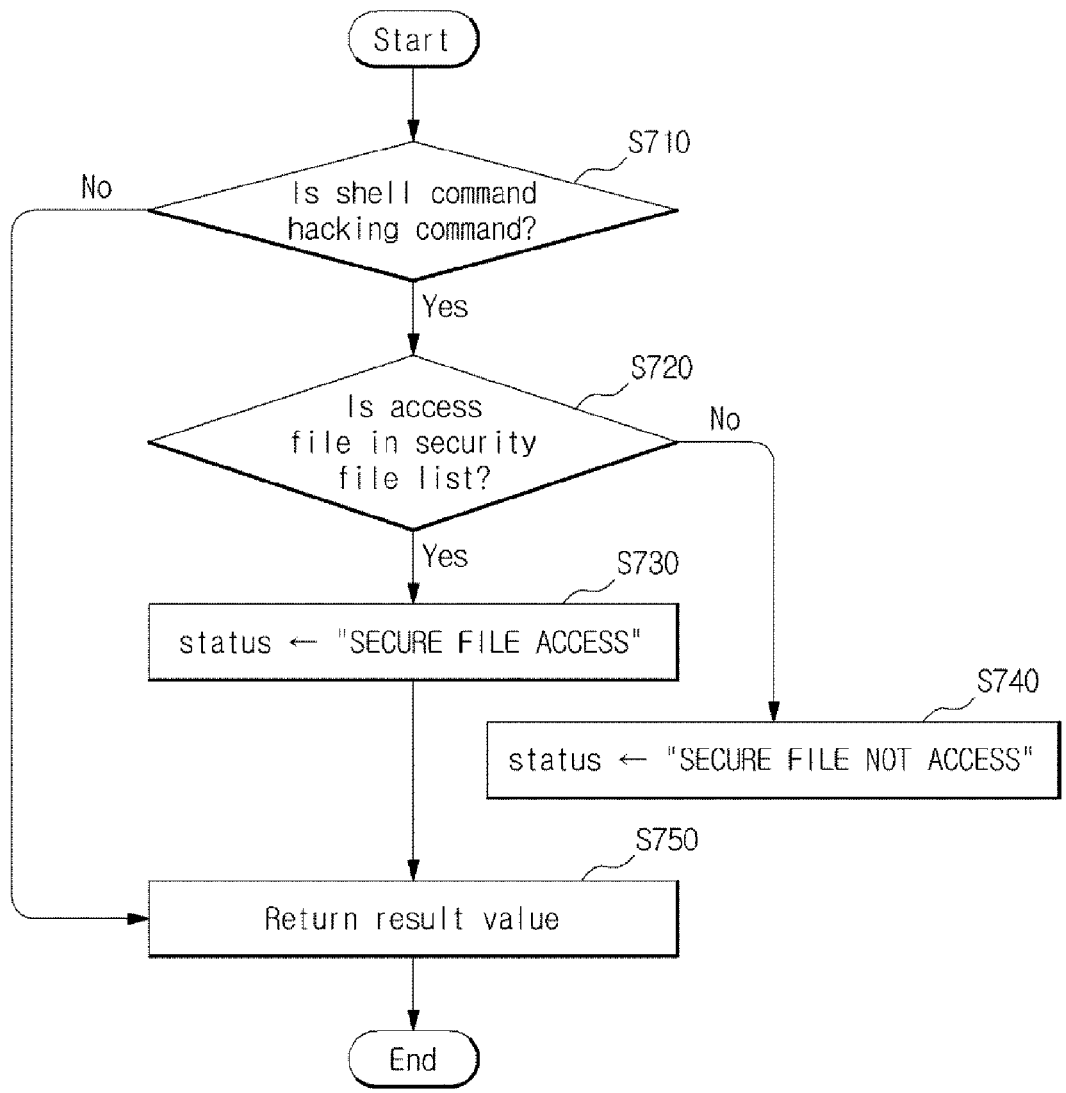

APPARATUS AND METHOD FOR GUARANTEEING SAFE EXECUTION OF SHELL COMMAND IN EMBEDDED SYSTEM

CROSS-REFERENCE TO RELATED APPLICATION

This application claims priority to and the benefit of Korean Patent Application No. 10-2013-0133144, filed on Nov. 4, 2013, the disclosure of which is incorporated herein by reference in its entirety.

BACKGROUND

1. Field of the Invention

The present invention relates to security of an embedded system, and more particularly, to an apparatus and method for enhancing security and safety of an embedded system by monitoring and blocking unauthorized execution of a shell command in the embedded system.

2. Discussion of Related Art

A Linux shell is called a shell because it surrounds an operating system (OS) like a shell, and provides an interactive environment for communication between the OS and users. Typical shell processing consists of a program in which users type commands, such as through a command interpreter, and the commands are translated to forms that a kernel can recognize and executed as processes of the kernel, and then their results are returned to the users. As a shell is a program, when users log in to Linux or connect to terminals, the shell is loaded into the memory and then executed. A state in which typing of the command from the terminal is awaited is called 'shell prompt,' and the Linux command is called a 'shell command.' There are various shells such as sh, bash, csh, fish, and so on. Linux shell commands are categorized into two classes: built-in shell commands and external shell commands. The shell identifies input commands by searching in the order of the built-in shell commands and the external shell commands. The external shell commands can be shown by typing '$PATH' in the shell prompt. An environment variable PATH of an administrator account (root) is to set a different value from that of user accounts for system security, and thus commands which can be used by user accounts are limited.

However, when the shell of an administrator account (root) is hacked by hackers, all shell commands can be executed, and thus there is concern of secondary damage occurring after the first hacking. For example, when the hard disk is removed and system logs are deleted through the hacked shell of the administrator account, it is difficult to execute functions of the embedded system or to know whether the system has been invaded.

Meanwhile, in an embedded system executing limited functions with special purposes, despite a limited number of processes that can be executed, unnecessary commands and/or processes remain when the embedded system is released as a product, and thus damage by invasion as described above can be caused. For example, though the commands, such as, remove directory (rmdir), format disk (fdisk), etc. need not be executed in the system released as the product with special purposes, because these commands are in the system, if the administrator account shell is hacked, there is concern of these commands being executed.

Hacking of embedded systems used in motor vehicles, airplanes, etc. causes serious risks, and due to recent additions of various smart functions, the necessity of embedded systems which are safe from hacking threats has increased. For example, when a smart gateway device that simultaneously processes functions of an engine control unit (ECU) and a navigation system is installed in a car and a hacker attempts to control the ECU after hacking a navigation OS, in addition to primary casualties, secondary and tertiary damage can occur.

However, the access control of commands provided by the current shell cannot guarantee the safety of the embedded system due to the problems described above.

SUMMARY OF THE INVENTION

The present invention for solving the above-mentioned problems is directed to provide a method and apparatus for guaranteeing safety of an embedded system through the access control of commands provided by a shell.

Also, the present invention is directed to provide a method and apparatus for protecting a system by blocking unauthorized executions of commands (or processes) provided by a shell in an embedded system.

According to an aspect of the present invention, there is provided an apparatus for guaranteeing safe execution of a shell command in an embedded system, including: a shell command detection part detecting an execution request of the shell command; and a shell command execution control part controlling execution of the shell command according to whether a password based on safety is provided for the shell command.

In an embodiment, the shell command detection part may detect a shell command execution request input through an administrator account.

In another embodiment, the shell command execution control part may determine the safety of the detected shell command using a shell command safety grade table.

In still another embodiment, the shell command safety grade table may include safety and a password level value based on the shell command.

In still another embodiment, the shell command execution control part may request a user to input the password level and the password of the shell command if the safety of the detected shell command is determined to be 'unsafe.'

In still another embodiment, the shell command execution control part may include a password table in which a user key value based on a password level and a secret key value are stored, generate the user key value using the password value input by the user and the secret key value stored in the table according to the level, and determine whether the user password is correct by comparing the generated user key value and the user key value stored in the table according to the level.

In still another embodiment, the apparatus may further include a hacking examination part examining whether the shell command for which the password has been provided is a command for hacking, and whether a target file accessed by the command is a security file.

In still another embodiment, the hacking examination part may include a hacking command list and a security file list, check whether the shell command is in the hacking command list, examine whether the target file is in the security file list when the shell command is in the hacking command list, and block execution of the shell command when the target file is in the security file list.

According to another aspect of the present invention, there is provided a method for guaranteeing safe execution of a shell command in an embedded system, including: detecting an execution request of a shell command; controlling execution of the shell command according to whether a password based on safety is provided for the shell command; and examining the possibility of hacking behavior for the shell command execution.

In an embodiment, controlling the execution of the shell command may include checking the safety of the shell command by referring to a shell command safety grade table, requesting and receiving a password level and a password to and from a user when the safety of the command is 'unsafe,' acquiring a secret key value corresponding to the received level from a password table and generating a user key value using the input password and the secret key value, and determining whether the password is correct by comparing the generated user key value and the user key value corresponding to the level stored in the password table.

In another embodiment, examining the possibility of hacking behavior for the shell command execution may include checking whether the shell command is in the hacking command list, and determining whether a target file accessed by the shell command is a system security file when the shell command is in the hacking command list.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a flowchart illustrating shell command processing;

FIG. 4 is a flowchart illustrating a method for guaranteeing safe execution of a shell command in accordance with embodiments of the present invention;

FIG. 5 is a flowchart illustrating a process for checking safety of a shell command in accordance with embodiments of the present invention;

FIG. 6 is a flowchart illustrating a process for checking a password in accordance with embodiments of the present invention; and FIG. 7 is a flowchart illustrating a process for examining hacking in accordance with embodiments of the present invention.

DETAILED DESCRIPTION OF EXEMPLARY EMBODIMENTS

Figure 2A:
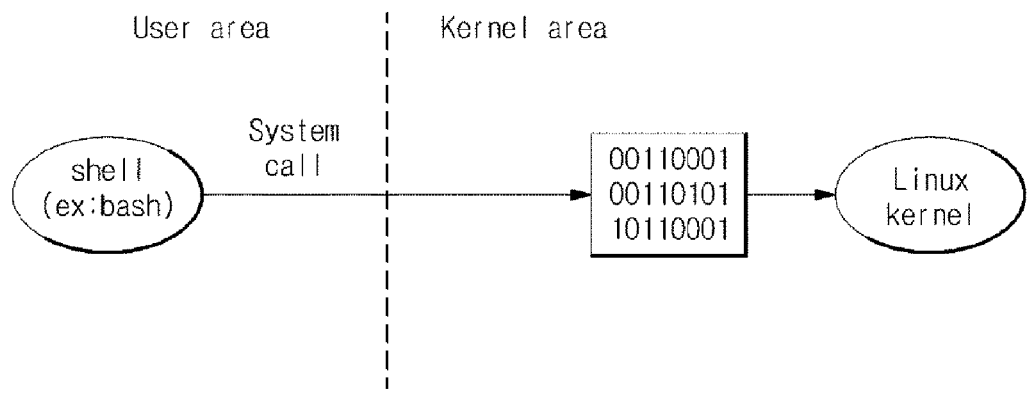
FIG. 2A illustrates a case in which all typical shell commands are executed without restrictions, and FIG. 2B conceptually illustrates a case in which safe execution of a shell command according to the present invention is introduced.

While the invention can be modified in various ways and take on various alternative forms, specific embodiments thereof are shown in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

When it is determined that detailed descriptions of related well-known technology might obscure the subject matter of the invention, those detailed descriptions will be omitted.

Elements of the specification and the claims referred to in singular, unless the context clearly indicates otherwise, should be generally interpreted to mean "one or more."

Moreover, terms described in the specification such as "module," "part" and "interface" refer to objects related to the computer, and for example, refer to hardware or software or a combination thereof.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereafter, with reference to the drawings, an embodiment of the present invention illustrates controlling an unauthorized execution of a shell command. First, for the sake of understanding, typical shell command processing is illustrated with reference to FIG. 1.

FIG. 1 is a flowchart illustrating shell command processing.

After an administrator acquires root shell authority (S110), the administrator inputs a shell command (S120).

The input shell command is translated to a form which a kernel can recognize through a command interpreter (S130), the command is processed by the kernel (S140), it is determined whether there is any more command input (S148), and when there is no additional input, the process ends. In detail, the kernel processing (S140) includes acquiring a command name and related parameters (S142), creating and executing a process for the command execution (S144), and displaying an execution result (S146).

According to the processing described above, when the root shell authority of the administrator is intercepted by a hacker, unauthorized shell commands such as hard disk deletion, system log deletion, etc. input by the hacker are executed through the kernel, and thus there is a risk of critical failure occurring in the embedded system.

Therefore, the present invention for preventing these risks is directed to prevent a system failure by execution of the unauthorized shell command in the embedded system and to realize security and safety of the system.

Figure 2B:
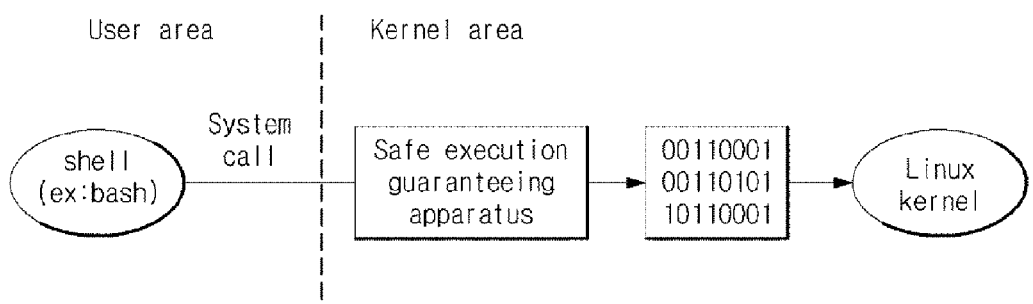

Referring to FIGS. 2A and 2B, a method for controlling safe execution of a shell command in accordance with the present invention is conceptually illustrated. FIG. 2A illustrates execution all typical shell commands without restrictions, and FIG. 2B illustrates safe execution through monitoring and filtering of a shell command transmitted from the user area by locating a shell command safe execution guaranteeing apparatus 200 between a user area shell process and a kernel in accordance with the present invention.

Hereinafter, an apparatus and method for guaranteeing safe execution of a shell command in accordance with embodiments of the present invention will be illustrated with reference to FIGS. 3 to 7.

Figure 3:
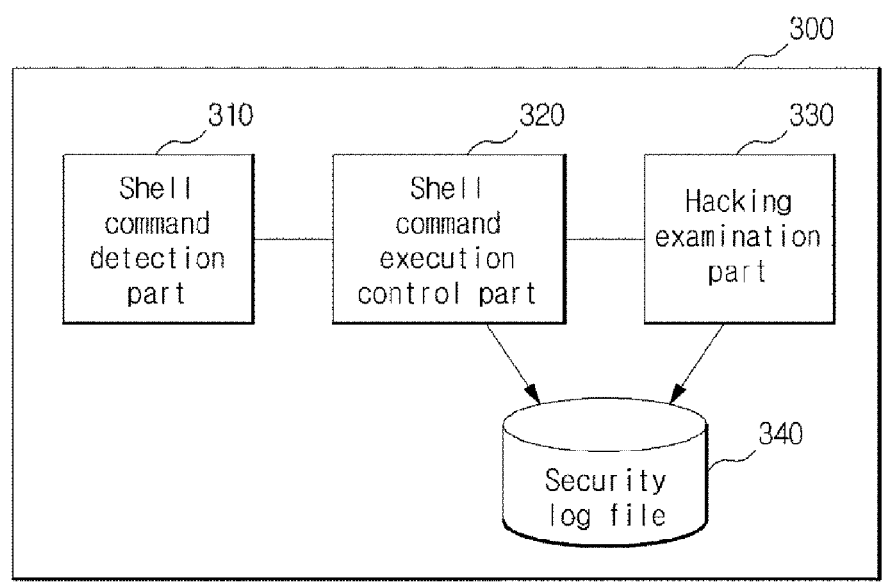
FIG. 3 is a block diagram illustrating a configuration of an apparatus for guaranteeing safe execution of a shell command in accordance with embodiments of the present invention.

FIG. 3 is a block diagram illustrating a configuration of an apparatus for guaranteeing safe execution of a shell command in accordance with embodiments of the present invention. As illustrated, a shell command safe execution guaranteeing apparatus 300 may include a shell command detection part 310, a shell command execution control part 320, a hacking examination part 330 and a security log storage 340.

The shell command detection part 310 detects an execution request of the shell command transmitted from a user area to a kernel area. In an embodiment, the shell command may be input through an administrator account having root shell authority rather than a user account.

The shell command execution control part 320 may determine whether the shell command which is detected by the shell command detection part 310 will be executed according to whether a password based on safety is provided for the shell command. In an embodiment, the command execution control part 320 may determine safety of the shell command using a shell command safety grade table. Table 1 below is an example of the shell command safety grade table.

TABLE 1

| Command name (sh_cmd) | Location (directory) | Authority (certification) | Password level (level) |
|---|---|---|---|
| mkfs.* | /usr/sbin | unsafe | 1 |
| Fdisk | /bin | unsafe | 1 |
| Ls | /bin | safe | 1 |
| Cd | /bin | safe | 1 |
| rm ??rf / | /bin | unsafe | 1 |
| passwd | /bin | unsafe | 2 |
| cat /dev/null > /var/log/* | /bin | unsafe | 1 |
| abc | /usr/local/bin | unsafe | 2 |
| ... | ... | ... | ... |

As illustrated, the shell command safety grade table includes safety and a password level which are set for each command.

In an embodiment, the shell command execution control part 320 searches for a command name matching the detected shell command name from the shell command safety grade table, and checks a safety value of the shell command. As a result of checking, if it is checked that the safety value of the shell command is 'safe,' the shell command is executed, and if it is checked that the safety value of the shell command is 'unsafe,' the user is requested to input a password level and a password (open key value) according to the relevant level.

In an embodiment, the shell command execution control part 320 acquires a secret key value corresponding to the password level which is input from the user with reference to a password table based on level, generates a user key value using the password (open key value) which is input by the user and the secret key value, and it is determined whether the password is correct by comparing the generated user key value and the user key value corresponding to the level stored in the password table according to the level. Table 2 below is an example of the password table based on level.

TABLE 2

| Password level (level) | User encoding key (key) | User secret key (priv_key) |
|---|---|---|
| 1 | key1 (= private_key1+public_key1 ) | private_key1 |
| 2 | key2 (= private_key2+public_key2) | private_key2 |
| 3 | key3 (= private_key3+public_key3) | private_key3 |

The shell command execution control part 320 may block execution of the command when the user does not provide the password. At this time, the shell command execution control part 320 may record a state in which the correct password is not provided for the command in the system security log storage 340.

The hacking examination part 330 examines whether the shell command that the user wants to execute is for hacking and whether a file that the user wants to access is a security file.

In an embodiment, the hacking examination part 330 checks whether the shell command is in a hacking command list (hacking_cmd_list), and examines whether a file that the user wants to access using the shell command is a system security file when the shell command is in the hacking command list. In another embodiment, the hacking examination part 330 may refer to the system security file list to determine whether the file to be accessed is in the system security file list, and when the file is in the system security file list, consider it to be hacking behavior and block the execution of the shell command. The hacking examination part 330 may record the shell command in the system security log storage 340 when the shell command is in the hacking command list or the file to be accessed using the shell command is a security file.

On the other hand, when the file is not a security file, the command is executed through kernel process creation. Table 3 below is an example of the system security file list

TABLE 3

| System Security File (filename) | Description (comment) |
|---|---|
| /root/.bash_history | SHELL COMMAND HISTORY FILE |
| /var/log/messages | LOG MESSAGE FILE |
| /var/log/maillog | MAIL LOG FILE |
| /var/log/secure | SECURITY LOG FILE |
| ... | ... |

FIG. 4 is a flowchart illustrating a method for guaranteeing safe execution of a shell command in accordance with embodiments of the present invention.

As illustrated, the method includes acquiring an input shell command (S410), checking safety of the shell command (S420), checking a password (S430) and examining hacking (S440). If the shell command is determined to be safe, a result value (status) set to 'TRUE' is returned and the shell command is executed (S480), and if the shell command is determined to be unsafe, a result value (status) set to 'FALSE' is returned and the shell command is not executed (S460).

More particularly, in operation S410, the shell command which is input into a user area by the user and transmitted to a kernel area is acquired.

In operation S420, safety of the acquired shell command is checked. In this regard, a detailed process for checking the safety of the shell command is illustrated in FIG. 5. As illustrated, in operation S520, whether or not the acquired shell command is in the relevant table is checked with reference to the shell command safety grade table. As a result of the checking, if the shell command is determined not to be in the relevant table, a result value (status) is set to "not certified command" (S550). On the other hand, if the shell command is in the relevant table, a safety value of the shell command is checked from the table (S530), and if the safety value is "safe," the result value (status) is set to "certified command" (S540).

The result value is returned for processing in the following S560.

Referring again to FIG. 4, if the result value of the shell command in operation S420 is "not certified command," the password is requested to the user and is checked (S430). In this regards, FIG. 6 is a flowchart illustrating a detailed process for checking a password in accordance with embodiments of the present invention.

As illustrated, in operation S610, a password level and a password (open key value) are requested to a user and received. In operation S620, a secret key value corresponding to the relevant level from a password table based on level is acquired, in operation S630, a user key value using the password (open key value) input by the user and the secret key value is generated, and in operation S640, it is determined whether the password is correct by comparing the generated user key value and the user key value corresponding to the level stored in the password table based on level. If the correct password is provided for the shell command, a result value (status) is set to 'PASS' (S650), if the password is incorrect, the result value (status) is set to NOT PASS' (S660), and the result value is returned (S670).

Referring again to FIG. 4, if the user has provided the correct password, the process proceeds to the examination of hacking (S440). A process for examining hacking in accordance with embodiments of the present invention is illustrated in FIG. 7 in detail.

As illustrated, in operation S710, it is checked that whether the shell command is in the hacking command list (hacking_cmd_list). If it is in the list, in operation S720, it is determined with reference to the system security file list whether a file to be accessed using the shell command is a system security file.

If it is determined that the file to be accessed is a system security file, the execution request of the shell command is considered to be hacking behavior and the result value is set to 'SECURE FILE ACCESS' (S730), if the file to be accessed is not a system security file, the result value is set to 'SECURE FILE NOT ACCESS' (S740), and the result value is returned (S750).

Referring again to FIG. 4, when it is checked that the shell command is a safe command as the result of checking the safety of the shell command in operation S420 or when the safety of the shell command is verified through the password check of S430 and the hacking examination of S440, the result value is set to 'TRUE' (S480), but when the password check of S430 is not passed or when the result of the hacking examination of S440 is that the file to be accessed is a security file, the file result value is set to 'FALSE' (S460), and the result value is returned.

Therefore, if the final result value is 'TRUE,' the shell command is executed in the kernel area, but if the final result value is 'FALSE,' execution of the shell command is blocked.

On the other hand, after checking the password in operation S430 and examining hacking in operation S440, the shell command is recorded in the security log file in operation S450 and S460 to be used in monitoring afterwards.

The above-described embodiments of the invention may be implemented in the form of computer instructions that can be performed through various computer components and may be recorded in computer-readable recording media. The computer-readable recording media may include a program instruction, a data file, and a data structure, and/or combinations thereof.

The program instructions recorded in the computer-readable recording media may be specially designed and prepared for the invention or may be an available well-known instruction for those skilled in the field of computer software. Examples of the computer-readable recording media include, for example, magnetic media such as a hard disk, a floppy disk, and a magnetic tape, optical media such as a CD-ROM and a DVD, magneto-optical media such as a floptical disk, and a hardware device, such as a ROM, a RAM, and a flash memory, that is specially made to store and perform the program instructions. The above-described media may be transmission media, such as optical or metal wires and waveguides, in addition to carrier waves that transmit signals to designate program instructions, data structures, etc. Examples of the program instructions may include a machine code generated by a compiler and a high-level language code that can be executed in a computer using an interpreter.

Such a hardware device may be configured as at least one software module in order to perform operations of the invention and vice versa.

According to an embodiment of the present invention, although an ordinary user obtains authorized shell of administrator (or root) in the embedded system, the preparing for artificial troubles can be by limiting execution of unauthorized shell commands (or processes) such as whole deletion of root file system.

According to the present invention, the execution of unauthorized shell commands (or processes) input through the shell having authorization of administrator can be detected, and the execution can be limited according to whether a password is correct. And, the preparing for artificial failures can be by preventing deletion of important files and deletion of related system logs in the embedded system released as a product.

As a result, the present invention can utilize as a security device of smart gateway device for the next generation motors, and can build safe servers from the hackers as authorization for execution of commands on the root shell of Linux server in banks can be granted.

While the present invention has been particularly described with reference to exemplary embodiments, it will be understood by those of skilled in art that various changes in form and details may be made without departing from the spirit and scope of the present invention. Therefore, the exemplary embodiments should be considered in a descriptive sense only and not for purposes of limitation. The scope of the invention is defined not by the detailed description of the invention but by the appended claims, and encompasses all modifications and equivalents that fall within the scope of the appended claims and will be construed as being included in the present invention.

What is claimed is:

1. An apparatus for guaranteeing safe execution of a shell command in an embedded system, comprising:
    a shell command detection part configured to detect an execution request of the shell command;
    a shell command execution control part configured to control execution of the shell command according to whether a password based on safety is provided for the detected shell command,
    a shell command examination part configured to examine a possibility of hacking behavior for the execution of shell command, and
    wherein, if the shell command is a safe command as a result of a safety checking of the shell command, the safe command is executed, and, if the shell command is deemed unsafe as the result of the safety checking, the shell command is verified as safe through both a password check and a hacking examination executed in sequence.

2. The apparatus of claim 1, wherein the shell command detection part detects a shell command execution request input through an administrator account.

3. The apparatus of claim 1, wherein the shell command execution control part determines the safety of the detected shell command using a shell command safety grade table.

4. The apparatus of claim 3, wherein the shell command safety grade table includes safety and a password level value based on the shell command.

5. The apparatus of claim 4, wherein the shell command execution control part requests a user to input a password level and a password of the shell command if the safety of the detected shell command is determined to be "unsafe".

6. The apparatus of claim 5, wherein the shell command execution control part includes a password table in which a user key value based on the password level and a secret key value are stored, generates the user key value using the password value input by the user and the secret key value stored in the table according to the level, and determines whether the user password is correct by comparing the generated user key value and the user key value stored in the table according to the level.

7. The apparatus of claim 1, wherein the hacking examination examines whether the shell command for which the password is provided is a command for hacking, and whether a target file accessed by the command is a security file.

8. The apparatus of claim 7, wherein the hacking examination examines whether the shell command is in a hacking command list, examines whether the target file is in a security file list if the shell command is in the hacking command list, and blocks execution of the shell command if the target file is in the security file list.

9. A method for guaranteeing safe execution of a shell command in an embedded system, the method comprising:
   executing in a computing system non-transitory computer program code stored on storage media, wherein the non-transitory computer program code includes instructions for:
      detecting an execution request of the shell command;
      controlling execution of the shell command according to whether a password based on safety is provided for the detected shell command;
      examining a possibility of hacking behavior for the execution of the shell command, and
   wherein, if the shell command is a safe command as a result of a safety checking of the shell command, the safe command is executed, and, if the shell command is deemed unsafe as the result of the safety checking, the shell command is verified as safe through both a password check and a hacking behavior examination executed in sequence.

10. The method of claim 9, wherein the examining of the possibility of hacking behavior for the execution of the shell command comprises:
   checking whether the shell command is in a hacking command list; and
   determining whether a target file accessed by the shell command is a system security file when the shell command is in the hacking command list.

* * * * *